(12) United States Patent
Woford

(10) Patent No.: US 6,902,272 B2
(45) Date of Patent: Jun. 7, 2005

(54) SOFT WRAP FRAMES WITH INTERCHANGEABLE LENSES

(76) Inventor: Laura F. Woford, 6907 O'Neil Ct., Wichita, KS (US) 67212-3352

( * ) Notice: Subject to any disclaimer, the term of this patent is extended or adjusted under 35 U.S.C. 154(b) by 114 days.

(21) Appl. No.: 10/194,827

(22) Filed: Jul. 12, 2002

(65) Prior Publication Data

US 2003/0020868 A1 Jan. 30, 2003

Related U.S. Application Data

(60) Provisional application No. 60/305,299, filed on Jul. 13, 2001.

(51) Int. Cl.[7] .............................................. G02C 3/00
(52) U.S. Cl. ......................................... 351/156; 2/435
(58) Field of Search ................................ 351/156, 157, 351/41, 63; 2/435; 1/440; 24/3.1, 31 R, 33 A, 71 J

(56) References Cited

U.S. PATENT DOCUMENTS

| | | |
|---|---|---|
| 2,212,596 A | 8/1940 | Fuller |
| 4,152,051 A | 5/1979 | Van Tiem et al. |
| 4,176,410 A | 12/1979 | Matthias |
| 4,504,127 A | 3/1985 | Cottet |
| 4,520,510 A | 6/1985 | Daigle |
| 4,616,367 A | 10/1986 | Jean, Jr. et al. |
| 4,689,838 A | 9/1987 | Angermann et al. |
| 4,712,254 A | 12/1987 | Daigle |
| 4,741,611 A | 5/1988 | Burns |
| 4,759,622 A | 7/1988 | Schmidthaler |
| 4,781,451 A | 11/1988 | McAllen |
| 4,799,781 A | 1/1989 | Weber |
| 4,806,008 A | 2/1989 | Tarloff |
| 4,813,776 A | 3/1989 | Borsos |
| 4,852,189 A | 8/1989 | Duggan |
| 5,015,087 A | 5/1991 | Baratelli |
| 5,048,944 A | 9/1991 | Porsche |
| 5,129,106 A | 7/1992 | Liou |
| 5,189,447 A | 2/1993 | Oleson |
| 5,191,364 A | 3/1993 | Kopfer |
| 5,196,364 A | 3/1993 | Tom |
| 5,239,320 A | 8/1993 | Allendorf et al. |
| 5,309,577 A | 5/1994 | Buononato et al. |
| 5,339,119 A | 8/1994 | Gardner |
| 5,519,896 A | 5/1996 | Ford |
| 5,576,775 A | 11/1996 | Bolle |
| 5,576,777 A | 11/1996 | Gioacchini |
| 5,602,603 A | 2/1997 | Bondet |
| 5,689,834 A | 11/1997 | Wilson |
| 5,711,035 A | 1/1998 | Haslbeck |
| 5,726,731 A | 3/1998 | Toler |
| 5,771,500 A | 6/1998 | Mayes |
| 5,801,805 A | 9/1998 | Mage |
| 5,818,569 A | * 10/1998 | Berent ........................ 351/156 |
| 5,862,530 A | 1/1999 | Shillington |
| 5,867,841 A | 2/1999 | Chiang |

(Continued)

Primary Examiner—Hung Xuan Dang
(74) Attorney, Agent, or Firm—Shook, Hardy & Bacon L.L.P.

(57) ABSTRACT

The present invention is a lightweight frame formed of layers of neoprene or other suitable material in which the layers are connected in such a way as to form lens receiving pockets on the frame. The lens receiving pockets enable different kinds of lenses to be easily inserted and removed from the frames. Another feature of the invention is a fastening system that uses Velcro™ which can be locked in place using a locking band. In another embodiment of the invention, a threaded coupler is used. The invention also provides for vented cushions which both protect the user from wind so that the eye socket does not become dry, but also allows the protected chambers in which the eyes reside by venting the chamber through these cushions. Another feature of the invention is a vertical strap which can be used to firmly secure the frame in the vertical direction.

20 Claims, 4 Drawing Sheets

U.S. PATENT DOCUMENTS

| | | |
|---|---|---|
| 5,903,331 A | 5/1999 | Lin |
| 5,915,542 A | 6/1999 | Swiet |
| 6,019,469 A | 2/2000 | Fecteau et al. |
| 6,024,444 A | 2/2000 | Little |
| 6,024,446 A | 2/2000 | Hall et al. |
| 6,026,518 A | 2/2000 | Brown |
| 6,059,408 A | 5/2000 | Bonacci |
| 6,065,833 A | 5/2000 | Tiano |
| 6,070,303 A | 6/2000 | Macy et al. |
| 6,074,059 A | 6/2000 | Glass et al. |
| 6,113,234 A | 9/2000 | Huang |
| 6,139,144 A | 10/2000 | Hynansky |
| 6,149,268 A | 11/2000 | Hall et al. |
| 6,216,282 B1 | 4/2001 | Marzec |
| 6,247,811 B1 | 6/2001 | Rhoades et al. |
| 6,353,977 B1 * | 3/2002 | Hagmann .................. 24/71 J |
| 2001/0001246 A1 | 5/2001 | Ono et al. |

* cited by examiner

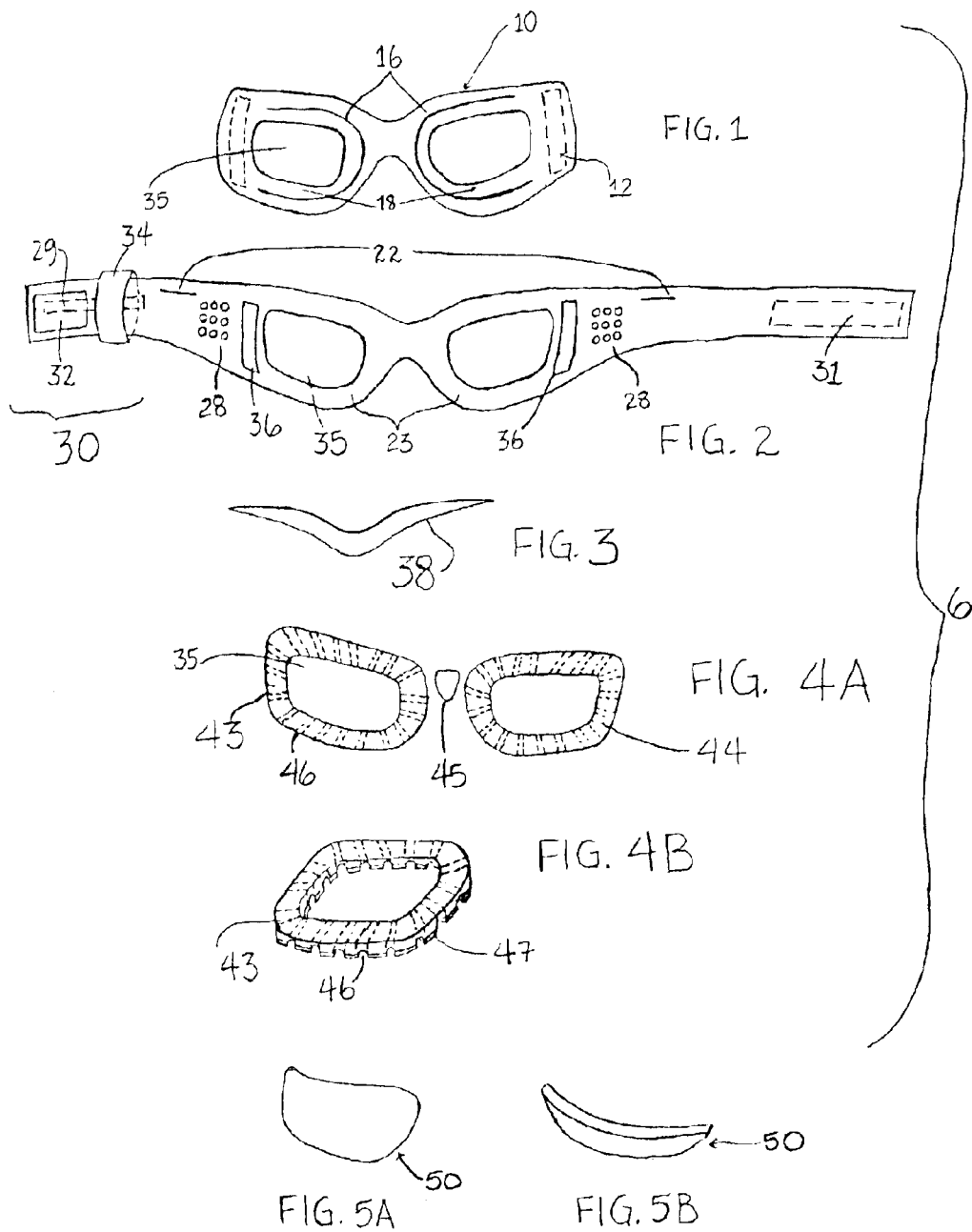

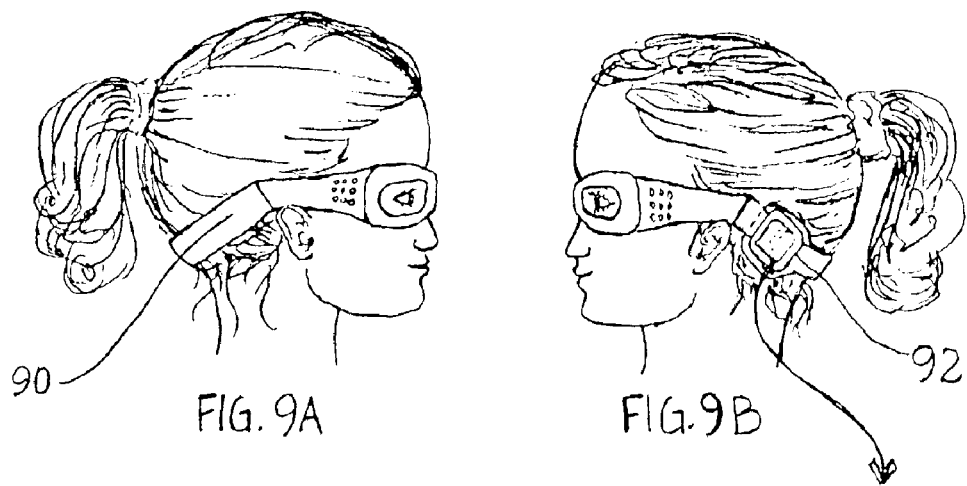
FIG. 9A  FIG. 9B
FIG. 10
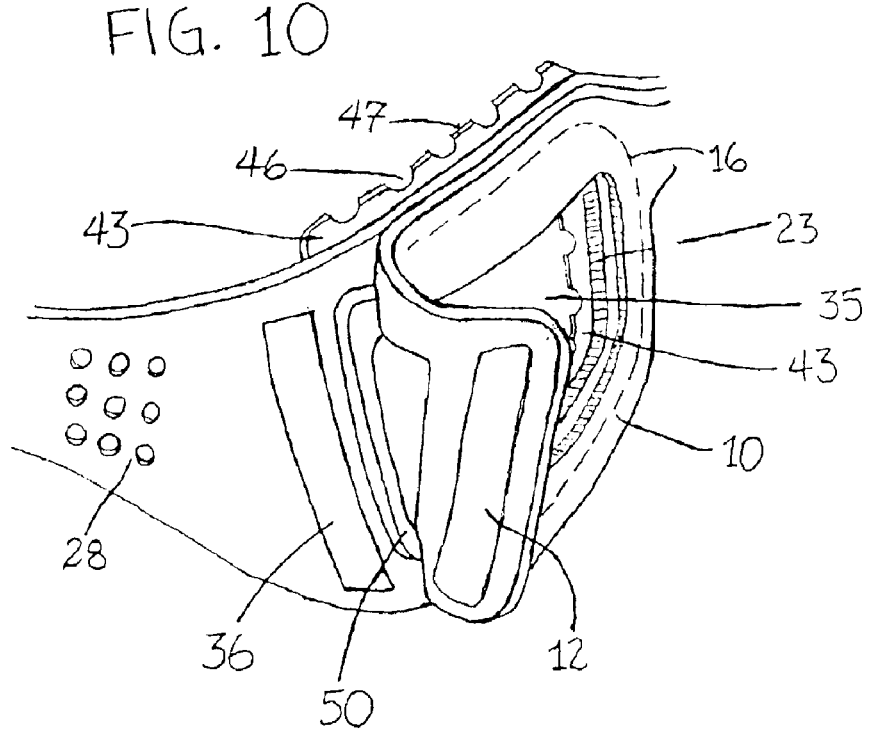

SOFT WRAP FRAMES WITH INTERCHANGEABLE LENSES

CROSS-REFERENCE TO RELATED APPLICATIONS

This application claims the benefit of U.S. Provisional Application No. 60/305,299, filed Jul. 13, 2001.

FIELD OF THE INVENTION

The present invention relates generally to an improved eyeglass frame. More specifically, the present invention relates to a soft, flexible eyeglass frame that wraps around the user's head, has interchangeable lenses, and has a novel connection means at the end of its temples that enables the user to secure the frame.

BACKGROUND OF THE INVENTION

Almost any eyeglass frame in the prior art causes some kind of discomfort. Traditional eyeglass frames may cause soreness in area in which the eyeglasses rest on the bridge of the nose. Pain can be caused by weight on the sensitive portion of the ear from the earpieces on the ends of the frames temples. Besides the conventional eyeglass frames, goggles have been used which are attached by an elastic band. These goggles, however, may cause pain to the eye socket area due to the pressure caused by the use of the elastic band.

A second problem in the prior art relates to the positioning capabilities of the frame. Prior art frames often become repositioned because of activity. The proper position for a lens is directly over the pupil area of the eyes. Optically active lenses will not work as intended when out of position. Thus, the inadvertent repositioning of the prior art frames will cause blurred vision or other optical inadequacies.

A third problem in the prior art is that of frame fragility. Prior art frames are often easily broken. Most conventional frames have parts that can become loose and lead to involuntary disassembly. One example is the use of tiny screws which are used to attach the temples to the main part of the frame (where the lenses are). Another problem is with lenses popping out of their frame housings. Many artisans have attempted to overcome these deficiencies in the prior art with inadequate results. Temple pieces have been attached with spring-loaded screw elements to increase durability. However, these spring-loaded screws have caused discomfort because of the additional force they place on the temples. Though frames have been made more durable over the years, even the sturdiest of these prior art frames can be destroyed via mistreatment by a child or the inadvertent application of force thereto (i.e., users stepping or sitting on them).

A fourth problem with the prior art frames is that they tend to be insecure. Most conventional frames can be easily pulled off or even fall off accidentally, especially if the user is engaged some kind of athletic activity. Special frame retaining devices have been used to hold the frame more securely to the user's face. However, these types of retainers do not work with goggles or frames with cable earpieces. Additionally, when retainers are used along with traditional frames, they cause additional pressure on the nose, often driving the nose pads into the bridge of the nose, causing discomfort. Several artisans have endeavored to alleviate this pressure by alternatively supporting the lenses (e.g., U.S. Pat. No. 5,196,871). However, none of these prior art attempts have resulted in the complete relief of nose pressure.

A fifth problem with conventional frames, is what is known as "gapping." Conventional frames hold the lenses out a distance from the face. This leaves a peripheral gap of uncorrected vision. In the case of sunglasses, gapping may leave the eye unprotected from various angles so that the eye is exposed to direct sunlight causing eye pain and possibly damage as a result. Some conventional sunglasses have addressed this problem by using frames that curve around and conform to the head (e.g., U.S. Pat. Nos. 5,576,775; 5,191,364; 5,189,447; and 4,741,611). However, none of these prior art designs adequately solves the peripheral vision problem—even in the case of goggles.

Another disadvantage of prior art frames is a kind of "greenhouse effect" caused by the sealed nature of prior art frames that are sealed to the skin, such as goggles. The stagnant air created by sealing the goggles to the face is heated by sunlight. This causes a buildup of heat. In addition to the heat and resulting sweat, another result is fog, which eliminates visibility. Unabsorbed sweat can cause irritation to the skin at the goggles' contact points. Aggravation of the situation can be caused by increased activity such as sports. Many artisans have strived to overcome these ventilation problems. (See for example, U.S. Pat. Nos. 5,867,841; 5,801,805; 6,065,833; 6,026,518; 5,722,035; 5,689,834; 5,576,775; 5,519,896; 5,239,320; and 6,216,282). However, need in the art still exists regarding these ventilation problems.

Prior art frames do not allow for easy removal of and replacement of lenses. Rather, most of the prior art lenses are integral to their respective frames. Many users desire a variety of lenses for different specific purposes. For example, some users will sometimes wear clear prescription lenses but then at a later time, desire lenses having a tint or some kind of UV protection. With the prior art lenses, these users would have to own a frame for each different kind of lens desired. However, most frames are expensive. Therefore, a need in the art exists to make a frame that allows for the interchangeability of a variety of lenses within a single frame.

SUMMARY OF THE INVENTION

One goal of the present invention is to provide a frame having a lens-receiving pocket that enables the user to easily change out different kinds of lenses without harming the frame.

Another goal of the present invention is to provide a frame made of neoprene or other similar material which comprises layers of the neoprene which are sewn together to form the pockets which hold the lenses, one of the layers of neoprene having elongated temples which are used to removably secure the frame to the user's head.

Another objective of the present invention is to create a unique latch used to removably secure the temples, the latch comprising a male and female swatch of Velcro™ which are held together by compression provided by an elastic locking member.

Another objective of the present invention is to form neoprene temples which are angled downward so that the head-engaging band engages the head at the nape of the neck of the user.

Yet another objective of the present invention is to create a retainer clip tethering system which will prevent the user from losing his or her eyeglasses.

Yet another objective of the present invention is to provide a pair of eye socket cushions which serve to position the lenses of the glasses sufficiently far from the eye of the user and creates a way of laterally stabilizing the lenses on either side of the nose to prevent side-to-side slippage, said cushions housing air-transmitting conduits which serve to vent the eyes to avoid the buildup of heat, perspiration and fog, while at the same time maintaining the desired wind resistance provided by the cushions.

A final objective of the present invention is to provide a vertical strap which provides even further stability to the frame.

BRIEF DESCRIPTION OF THE DRAWINGS

Additional aspects of the present invention will become evident upon reviewing the non-limiting embodiments described in the specifications and claims taken in conjunction with the accompanying figures, wherein like reference numerals denote like elements.

FIG. 1 illustrates an exemplary front view of the first layer of the frame of the present invention.

FIG. 2 illustrates an exemplary view of the second layer of the frame of the present invention.

FIG. 3 shows the positioning brow piece of the present invention.

FIG. 4A shows the eye socket cushions of the present invention as well as the nose piece of the present invention.

FIG. 4B shows a perspective view of one eye socket cushion exposing the channels on the underside of the cushion which are used to form conduits when the cushion is fixed to the second layer of the frame and fitted against the face.

FIGS. 5A through 5B show a lens for use with the frame.

FIG. 9 illustrates a nape of neck embodiment of the present invention wherein a threaded closing is used.

FIG. 10 illustrates a perspective close-up view of a lens within the frames shown in FIGS. 1 through 4.

DETAILED DESCRIPTION

Figure 6:
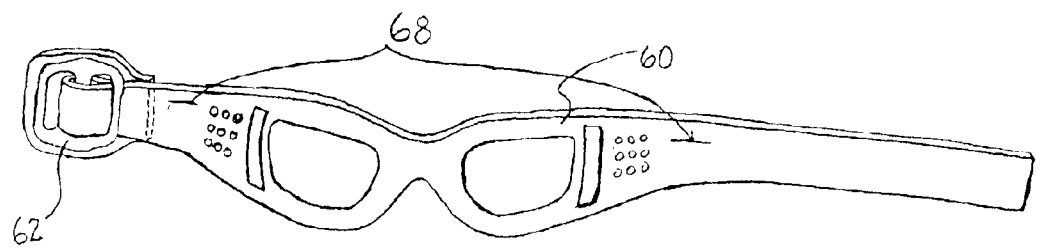
FIG. 6 shows an alternative embodiment of the present invention with a second layer having a threaded closing rather than the hook and loop closure system of FIG. 2.

Disclosed is a soft, flexible frame that provides superior ventilation, is light weight, can be easily fixed on the user and removed, and allows for interchangeability of different lenses.

The first embodiment of applicant's invention may be seen in FIGS. 1 through 5, 10, 11, 12B, and 14. Starting first with FIG. 1, a first layer 10 of the present invention is shown. This first layer may be constructed of a thin gauge neoprene or any other suitable material or fabric (1 mil used here, but other thicknesses may be used). Additionally, a decorative layer comprising ultrasuede or any other aesthetically pleasing material may be used on the outside of this first layer (not pictured) for decorative or ornamental purposes.

FIG. 2 shows a second layer 20 of the present invention, that, as with the first layer is a cut out thin layer of neoprene (1 mil layer of neoprene is used here, but other thicknesses and materials are also possible) having a first elongated portion 24, a second elongated portion 26, a perforated area 28, an enlarged lens housing portion 23, a pair of slots 22 for receiving a vertical band 82 (shown in FIG. 12), and a fastener 30. Fastener 30 comprises a male patch of Velcro™ 31, a female patch of Velcro™ 32, and a locking band 34. Attached to the second elongated narrow portion 26, is a retainer loop 29, to which a retainer clip is tethered as will be hereinafter shown and described. The inner surface of first layer 10 of the frame is attached to the outer surface of second layer 20 by a number of stitch lines 16. Any similar means of attaching the two layers (i.e., the use of a line of adhesive, bonding) may be used to create a attachment and/or adhesion of the two layers, however. Stitch or bonding lines 16 are configured so as to form lens-receiving pockets 18 in the now-bonded first and second layers (10 and 20 respectively). Pockets 18 are used to receive any variety of lenses 50, examples of which can be seen in FIG. 5A through C. Lenses 50 may or may not be optically active and may be either partially or totally transparent. Additionally, lenses may be tinted to protect the user's eyes from the sun or not. The lenses are secured within the frame by a closure system comprising a swatch of male Velcro™ 12 which acts in conjunction with a swatch of female Velcro™ 36 on the second layer. Male 12 and female 36 swatches may be intermeshed or loosed to enable the lens 50 to be held or slid into and out of the opening 35 for each pocket 18. As is known by those skilled in the art. Velcro™ consists of a swatch of fabric of small hooks that sticks to a corresponding swatch of fabric having small loops which are snared on the hooks.

FIG. 3 shows a positioning brow piece 38 of the present invention. Brow piece 38 may comprise a single piece/layer of thin neoprene (2 mil or greater used here, but other thicknesses or material could be used) and is preferably lined with wicking material or some other kind of absorbent, skin friendly material. Brow piece 38 serves to help properly position the upper part of the frame slightly outward from the brow to compensate for the relatively more outward contact point of the frame with the upper part of the nose. This helps to appropriately position the lenses for optical purposes while at the same time maintaining maximum comfort.

FIG. 4A shows a pair of eye cushions, 43 and 44, and a nose piece 45 of the invention. Cushions 43 and 44 are cut out of relatively thick layered neoprene (preferably from 2 mil to 10 mil, but other thicknesses may be used) or other suitable material. Additionally, cushions 43 and 44 may have an absorbent or wicking fabric bonded to their inner surfaces. Nose piece 45 also comprises neoprene from 2 mil to 10 mil and may also have an absorbent or wicking fabric bonded to its inner surface. FIG. 4B shows a helpful perspective view of left eye cushion 43. As can be seen in FIG. 4B, cushion 43 has a frame side surface 47 and a face side surface 48. Face side surface 48 is the surface having the comfortable absorbent or wicking fabric bonded to it since this is the surface that contacts the wearer's face. Each of cushions 43 and 44 has at least one, or plural, conduits 46 formed there-through. Conduits, 46, are formed when the face-side surface 47 contacts the face of the wearer by way of a number of U-shaped channels 49 formed on the inner side surface 47 of each cushion. After each cushion's flat outer surface is adhered to the inside surface of the second layer, these conduits serve to allow air in and out of the enclosures formed when the frame is positioned over the eye sockets. The U-shaped channels 49 shown here are approximately 2.5 mils in depth and 1 mil width. However, any variation is possible and other means of ventilation are also within the scope of this invention.

Figure 14:
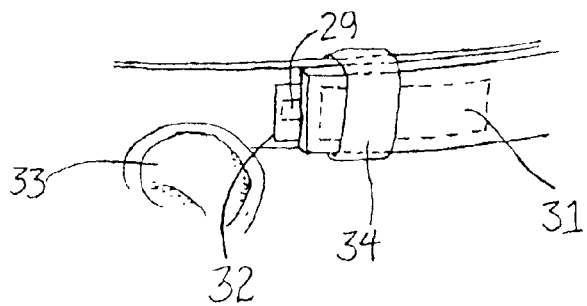
FIG. 14 shows a close-up view of the hook-and-loop closure with the sliding elastic loop secured in position to prevent the band from becoming unlatched.

FIG. 14 shows how the elongated portions of the second member make the frame removably attachable. Male 31 and female 32 patches of Velcro™ are shown in the figure in engaged position. The point of attachment is immediately behind the user's ear 33. As can be seen, elastic locking band 34 is slid over the male 31 and female 32 patches of Velcro™ so as to hold them in firm engagement and also prevent them coming apart thus locking them into place. It is important to note—and perhaps obvious—that a male patch could be substituted for the female patch, and a female patch substituted for the male patch, and the same effect provided. This principle is of course also true for the male patch 12 and female 36 patches of Velcro™ used for the lens pocket opening 35.

FIG. 15 shows a retainer 100 of the invention. Retainer 100 has a clip 106 with a tether 102 attached. Tether 102 has a loop 104 on its end which is used to engage with the retainer loop 29 on the second elongated portion 26 of the second layer 20 as shown in FIGS. 2 and 12B. FIG. 12B shows how retainer 100 is attached. First, loop 104 is brought underneath retainer loop 29 and drawn through. Next, clip 106 is passed through loop 104. Clip 106 is then pulled away from loop 29 to cinch the loop into a knot (see 104 in FIG. 12B, shows in cinched stage). Knot 106 secures tether 102 at its loop end to the frame. Retainer clip 106 on the other end of the tether may now be attached to an article of the user's clothing or any other place it may be secured to the user so that in case the frame becomes detached from user, it will not be lost.

A second embodiment of the invention is shown in FIG. 6. This second embodiment 60 is very similar to the first embodiment shown in FIGS. 1 through 5, 10, 12B, 13, and 14, except that its second layer 60 has a threaded coupler system as shown in FIG. 6 instead of a fastener 30 as shown in FIG. 14. This threaded coupler system comprises a coupler 62 and a plain band end 64 which is received by said coupler 62 to secure frame 62 to the users head. Also disclosed is a coupler cushion 66 that is used to protect the user from discomfort caused by contact of the coupler 62 with the skin. Cushion may be made of neoprene with wicked or absorbent fabric lining. Coupler cushion 66 is sewn or otherwise attached to the elongated portion of second layer.

Figure 7:
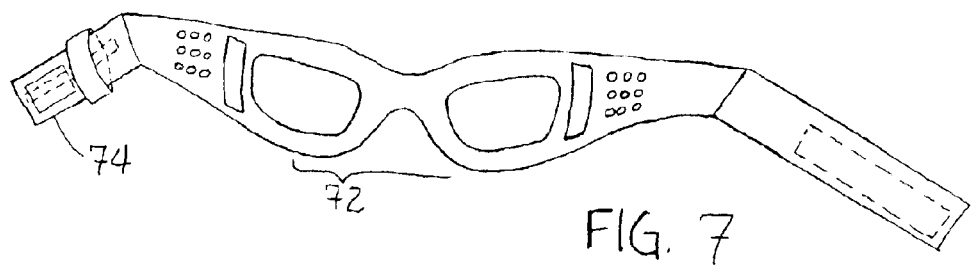
FIG. 7 shows another embodiment wherein the temples of the frame formed by the second layer are angled downward encircling the head below the hairline at the nape of the neck and having the hook and loop closure system like the FIG. 2 embodiment.
Figure 8A:
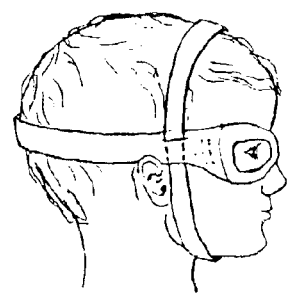
FIGS. 8A and 8B show right and left side views of the threaded closing embodiment of FIG. 6 when used with a vertical strap.
Figure 8B:
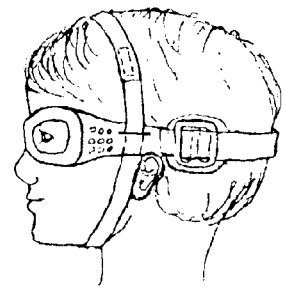

A third embodiment is disclosed in FIG. 7. This third embodiment is identical to the first embodiment shown in FIGS. 1–5 except that it has a different second layer design. A second layer 70 this third embodiment is different in that its' elongated first 74 and second 76 portions that are angled slightly downward. See FIG. 7. This so that when the portions 74 and 76 are secured behind the user's head, they engage the user's head at the nape of the user's neck rather than at the back of the head (as do the elongated portions of the first embodiment). This nape-of-neck design provides numerous advantages, one of which is that hair is not constrained to the head, causing additional heat.

FIG. 9 shows a fourth embodiment. This fourth embodiment has elongated portions that are angled downward just like the third embodiment shown in FIG. 7. However, the fourth embodiment is different in that its elongated portions are used in conjunction with a coupler 92 instead of the Velcro™ arrangement. Coupler 92 is used the same way as is coupler 62 of FIG. 6.

Figure 12A:
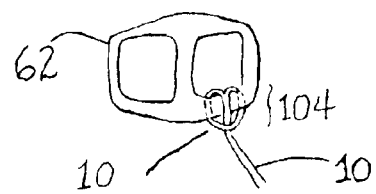
FIG. 12A shows the tethering loop attached to the threaded closing from the embodiment shown in FIG. 6.
Figure 12B:
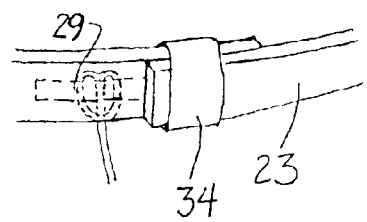
FIG. 12B shows the tethering loop of the retainer clip of the present invention connected to the hook-and-loop closure shown in FIG. 2.
Figure 13:
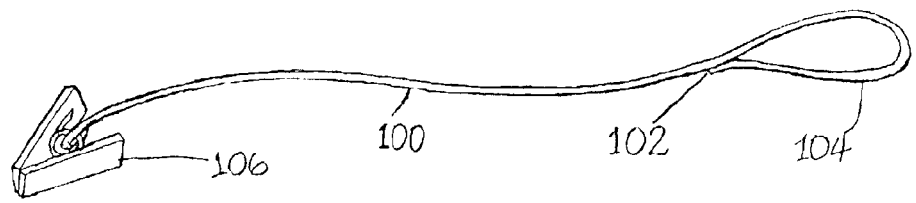
FIG. 13 shows the retainer clip of the present invention along with the tethering features.

FIG. 12A shows how retainer 100 can be attached to the second or fourth embodiments having threaded couplers 62, 92. For these embodiments the loop 104 on tether 102 is attached to the coupler 602 in much the same fashion as was disclosed in FIG. 12B for the Velcro™ attachment systems. With the coupler 62 the loop is inserted through a portion of coupler 62 and then clip 106 is drawn through loop 104 and pulled until a knot (see 104 as shown in FIG. 12A) is formed securing tether 102 to the coupler 62. At this point, clip 106 is tethered and ready to be clipped to an article of the user's clothing or any place else in which the frame can be secured in case it becomes detached from the user's head.

Figure 11:
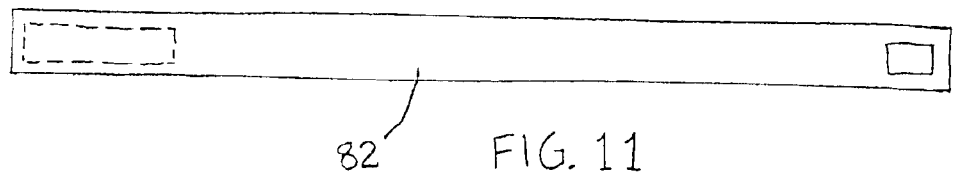
FIG. 11 shows the vertical strap of the present invention.

FIG. 11 shows a vertical strap, also made of neoprene or like material, which can be used with any of the four previously described embodiments of the present invention. This feature is shown in use with the second embodiment of the invention 60 and is installed by sliding it through slits 68 on second layer 60 at some point on the elongated portions of the frame. These slits, though not shown in some of the figures, may easily added to any of the above four embodiments, and should be considered an optional feature of each.

Yet another feature possible in any of the four above-described embodiments is that a unique serial number may be used on the frame with either a corporate address or some other appropriate mailing address which would enable, upon delivery to the said address, the frames to be returned to the original purchaser at a registered address (registered by purchaser).

At numerous places above, particular materials (i.e., neoprene, wicking material, absorbent material) and other materials and thicknesses have been disclosed. These particulars are only a small sampling of the many materials or thicknesses that would fall within the scope of the invention. Further, the comfort providing materials (i.e., wicking and/or absorbent materials) could also be used on any part of the frame potentially coming into contact with the skin (i.e., inner surfaces of second layer, elongated portions). Additionally, the frame could be integrally molded rather than constructed with layers, the frame could be constructed without cushions, the frame could be constructed having only one lens receiving pocket, inter alia. Many other changes, modifications, variations, and other uses and applications of the subject invention will become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A device for supporting a lens on a face of a being, comprising:

a frame having a see-through portion defined by said frame, said see-through portion allowing vision there-through;

said frame also having a first elongated member extending from one end of said frame and terminating in a first end;

said frame also having a second elongated member extending from another end of said frame from which the first elongated member extends;

a patch on said first end;

a patch on said second end, said patch on said second end being removeably attachable to said patch on said first end; and a locking member adapted to compress said first and second ends together to maintain engagement of said patches.

2. The device of claim 1 wherein one of said patches comprises a material having hooks and the other of said patches comprises material having loops, the patches forming a zone of engagement when latched.

3. The device of claim 1 wherein said first and second elongated members extend outward from said frame in a substantially horizontal direction so that once said first and second ends of said elongated portions are latched, the head-engaging band engages the users head substantially horizontally.

4. The device of claim 1 wherein said first and second elongated members extend outward from said frame angled downward so that once said first and second ends of said elongated portions are latched, the head-engaging band engages the users head at the nape of the neck.

5. The device of claim 1 further comprising a retainer clip tethered to one of said elongated first or second members.

6. The device of claim 1 wherein said frame further comprises:

at least one lens-receiving pocket defined by said frame said pocket enabling the user to easily insert or remove lenses.

7. The device of claim 6 wherein said frame comprises a first layer and a second layer, said pocket being defined by said first and second layers by bonding said layers together to engage the periphery of said lens with the area of the first and second layers proximate said see-through portion.

8. The device of claim 7 wherein said first layer has an inside surface and an outside surface and said second layer with an inside surface and an outside surface and said inside surface of said first layer is bonded to said outside surface of said second surface.

9. The device of claim 8 wherein said inside surface of said second layer is more proximate to said face than said first layer.

10. The device of claim 9 wherein said first layer is bonded to said second layer by one of stitching or adhesive.

11. The device of claim 7 wherein said first and second layers are made of a soft flexible material.

12. The device of claim 1 wherein said locking member is elastically bandable around said first aid second ends to maintain engagement of said patches.

13. The device of claim 1 wherein said frame further comprises an elastic vertical band attached to said frame at both the first and second elongated members and is banded around the crown and chin of said head to provide vertical stability to said frame.

14. The device of claim 1 further comprising:

at least one eye socket cushion with an outer surface and a face-engaging surface, said outer surface of said cushion being attached to an inside surface of said frame;

said cushion defining a see-through aperture, said aperture of said cushion substantially matching the shape of said see-through portion of said frame such that the user's eyesight is not obstructed, said cushion further defining a sealed enclosure thus protecting the eye of the user from exposure to gusts of wind.

15. The device of claim 14 wherein said enclosure is vented.

16. The device of claim 15 wherein said enclosure is vented using one or more conduits which allow for the passage of air to and from said chamber to the atmosphere.

17. The device of claim 16 wherein said conduits are defined by one or more channels formed in said face-engaging surface of said cushion when said cushion placed on the face of the being.

18. The device of claim 17 further comprising a brow piece attached to the inside surface of said second layer used to comfortably engage the brow just above the nose and properly orient at least one lens held within said frame.

19. The device of claim 1 wherein said frame comprises a first layer and a second layer, said first and second layers being bonded together to engage the periphery of a lens in the area of the first and second layers proximate said see-through portion and where said second layer is integral with said first and second elongated members.

20. A device for supporting a lens on a face of a being, comprising:

a frame having a see-through portion defined by said frame, said see-through portion allowing vision therethrough;

said frame also having a first elongated member extending from one end of said frame and terminating in a first end;

said frame also having a second elongated member extending from another end of said frame from which the first elongated member extends;

a hooking patch on said first end;

a looping patch on said second end, said looping patch being removeably attachable to said hooking patch on said first end;

a locking member elastically banded around said first and second ends to maintain engagement of said hooking and looping patches and thus compressibly lock said ends together.

* * * * *